(12) United States Patent
Price

(10) Patent No.: US 9,073,485 B2
(45) Date of Patent: Jul. 7, 2015

(54) SYSTEM AND METHOD OF CONTROLLING REFRACTION IN WINDSHIELD BASED ON DRIVER OCULAR PRESCRIPTION

(71) Applicants: Hyundai Motor Company, Seoul (KR); Kia Motors Corporation, Seoul (KR); Hyundai America Technical Center, Inc., Superior Township, MI (US)

(72) Inventor: Chadd Price, Livonia, MI (US)

(73) Assignees: Hyundai Motor Company, Seoul (KR); Kia Motors Corporation, Seoul (KR); Hyundai America Technical Center, Inc., Superior Township, MI (US)

( * ) Notice: Subject to any disclaimer, the term of this patent is extended or adjusted under 35 U.S.C. 154(b) by 232 days.

(21) Appl. No.: 13/630,217

(22) Filed: Sep. 28, 2012

(65) Prior Publication Data

US 2014/0092332 A1 Apr. 3, 2014

(51) Int. Cl.
*G02F 1/1335* (2006.01)
*B60R 1/00* (2006.01)
*G02F 1/29* (2006.01)

(52) U.S. Cl.
CPC ........... *B60R 1/001* (2013.01); *G02F 2001/294* (2013.01)

(58) Field of Classification Search
CPC ....................................................... G02C 7/083
USPC ............................................................ 349/13
See application file for complete search history.

(56) References Cited

U.S. PATENT DOCUMENTS

| | | | |
|---|---|---|---|
| 7,700,179 B2 | 4/2010 | Travis et al. | |
| 7,864,431 B2 | 1/2011 | Martin | |
| 2003/0169213 A1* | 9/2003 | Spero | 345/7 |
| 2006/0012747 A1* | 1/2006 | Wahl et al. | 351/41 |
| 2006/0171696 A1* | 8/2006 | Murata et al. | 396/72 |
| 2007/0139333 A1* | 6/2007 | Sato et al. | 345/90 |
| 2009/0168185 A1* | 7/2009 | Augustine | 359/613 |
| 2010/0151210 A1* | 6/2010 | Shimatani | 428/192 |
| 2013/0278889 A1* | 10/2013 | Lapstun | 351/159.4 |

FOREIGN PATENT DOCUMENTS

KR 10-0187099 12/1998

* cited by examiner

*Primary Examiner* — Bumsuk Won
*Assistant Examiner* — Edmond Lau
(74) *Attorney, Agent, or Firm* — Mintz Levin Cohn Ferris Glovsky and Popeo, P.C.; Peter F. Corless

(57) ABSTRACT

Technique for implementing a liquid crystal layer installed in a transmissive object installed in a vehicle. More specifically, a control system is configured to activate a liquid crystal layer that has been installed a vehicle. The control system then determines an ocular prescription strength of a driver, and sets a refractive index of one or more liquid crystal layers disposed within the liquid crystal layer to adjust a refractive index of the windshield to correlate with the determined ocular prescription strength.

18 Claims, 6 Drawing Sheets

SYSTEM AND METHOD OF CONTROLLING REFRACTION IN WINDSHIELD BASED ON DRIVER OCULAR PRESCRIPTION

FIELD OF THE INVENTION

The present invention relates to a system and method for controlling and adjusting the refractive index of a liquid crystal layer in a transmissive object installed in the vehicle by repositioning one or more liquid crystals embedded in, for example, a variable focus windshield based upon a driver's ocular prescription.

BACKGROUND

Today, a significant portion of the population require corrective lens in order to see appropriately while driving. This requirement may be mandatory on the part of the individual's municipality or otherwise. Additionally, as individuals age their eyesight declines as a result. Thus, they may take it upon themselves to wear corrective lenses while driving in order to be able to effectively identify their surroundings while driving.

However, it is not uncommon for individuals to forget or misplace their corrective lenses. As a result, these individuals may have a difficult time driving. This also creates a safety hazard to the public and the driver since obstacles, vehicles, people, etc. may be blurry to the driver and thus go unnoticed. Thus, there is a need for a vehicular system that is able to effectively aide the driver in correcting the driver's vision so that the driver is able to see at an appropriate level even when the driver is not wearing his or her corrective lenses.

SUMMARY

Systems and methods for controlling and adjusting the refractive index of a transmissive object including a liquid crystal layer by repositioning one or more liquid crystals embedded in the liquid crystal layer based upon a driver's ocular prescription are provided herein. For example, a vehicle in the illustrative embodiment of the present invention may be implemented with a variable focus windshield that includes adjustable liquid crystals (transmissive in nature) embedded therein to be arranged so that at least one portion of the windshield is refracted based upon the driver's ocular prescription. The variable focus windshield may be in communication with a control system (hereinafter "the system") that is configured to control the operations of the variable focus windshield based on various factors input to the system and input and analyze data via a processor, memory, imaging devices, etc. These operations include but are not limited to activation, adjustments, current application, etc. It should be noted that although the illustrative embodiment of the present invention is discussed below in reference to a variable focus windshield, the illustrative embodiment of the present invention may be utilized with any transmissive object, e.g., a side window, rear window, instrument cluster, display screen, etc., that includes a liquid crystal layer. Therefore, the exemplary embodiments of the present invention should not be limited as such.

In one exemplary embodiment of the present invention, a method for controlling the refraction of the windshield is as follows. Initially, the variable focus windshield in a vehicle may be activated by a triggering event, such as ignition of the vehicle, an eye test conducted on the driver, or images of the driver received at a control device in response to the driver entering the vehicle. Once the variable focus windshield is activated, the control device then determines a driver's ocular prescription strength either based upon data previous stored on a storage device within the control system or upon an eye test conducted on the driver. The system then dynamically adjusts a refractive index of the variable focus windshield by rearranging one or more liquid crystal layers within at least a portion of the variable focus windshield to adjust the refractive index of that portion of the windshield to correlate with the driver's ocular prescription. This may be done by, for example, applying a specific amount of current to the crystals within the windshield, or by any other method known in the art for rearranging liquid crystals so that their refractive index is altered accordingly.

Furthermore, as stated above, the variable focus windshield may be activated by any one of a number of triggering events. For example, the variable focus windshield may be activated in response to the system detecting that the driver is not wearing corrective lenses, by conducting an eye test on the driver in response to receiving an image of the driver not wearing his or her glass, based upon a driver manually requesting that the variable focus windshield be activated or simply based upon turning on the ignition of the vehicle.

As stated above, an eye test may be administered by the system to determine the driver's current ocular prescription, e.g., by providing an eye chart on a heads up display and requesting, through voice communication, that the driver recite a specific line of the eye chart. Based upon the results of the eye test, the system may then determine the ocular prescription strength of the driver, and automatically enter the ocular prescription strength of the driver into a data table associated with a particular driver profile stored on a storage device located either remotely or internally. This ocular prescription strength may also be entered manually by the driver depending upon the dynamic nature of the system.

Furthermore, it is common for a number of drivers to wear contact lenses rather than glasses as a form of corrective lens while driving. Therefore, prior to activating the variable focus windshield, in those cases were an eye exam is not performed on the driver, the system may also be configured to determine if the driver is a contact lens wearer based for example an input question to the driver (e.g., Is the driver currently wearing contact lenses?). Accordingly, the system, in this instance, would only activate the system, when it is determined that the driver requires contact lenses. This, however, is merely an example and any other method for determining whether or not a driver is wearing contact lenses (or any type of corrective lens for that matter) may also be utilized.

In some exemplary embodiments of the present invention, the prescription strength of the driver may be manually entered by the driver via a touch screen display or voice control. The touch screen and voice control systems may be embodied as any well known touch screen and voice control system that may be integrated with the exemplary embodiments of the present invention.

Furthermore, in some exemplary embodiments of the present invention, adjusting the refractive index for the variable focus windshield may further include, detecting the position of a driver's seat in relation to the variable focus windshield to better focus the windshield, powering on and activating at least one liquid crystal grid layer disposed between a glass layer of the variable focus windshield and then adjusting the refractive index of the liquid crystal layer to correlate with the driver's ocular prescription. By applying, for example, a specific current to the liquid crystal grid layer the crystals within the liquid crystal layer are repositioned to in turn adjust the refractive index of the variable focus windshield to correlate with the driver's ocular prescription.

The system described above may also include an active focus system. When the system includes an active focus system and the active focus system is turned on, the system is configured to constantly adjust the focus of the variable focus windshield based upon results calculated by the active focus system. In particular, once the active focus system is activated, an interior camera installed in the vehicle may be configured to track a driver's eye movement to determine a current line of sight of the driver, detect one or more objects outside of the vehicle within the current line of sight of the driver by one or more exterior cameras, and measure the distance to the one or more objects from the seat position of the driver and the location of the one or more objects in relation to the seat position of the driver.

Furthermore, based upon the driver's detected line of sight detected by the active focus system, the system may also be configure to adjust the portion of the windshield in which the current to the liquid crystals is being applied so that the portion of the windshield in which the refractive index is adjusted is varied based up on the driver's line of sight.

The variable focus windshield utilized by the system of the exemplary embodiment of the present invention may include a plastic layer (e.g., polyvinyl butyral) and the liquid crystal layer adjacent to one another and disposed between two layers of glass. Alternatively, in another exemplary embodiment of the present invention the plastic layer may disposed between a first layer of glass and a second layer of glass, and the liquid crystal layer may be disposed between the second layer of glass and a third layer of glass.

Advantageously, the exemplary embodiment of the present invention allows for a driver to have a means of correcting his or her vision while driving even when the driver is not wearing his or her corrective lenses in the vehicle.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION

Figure 2:
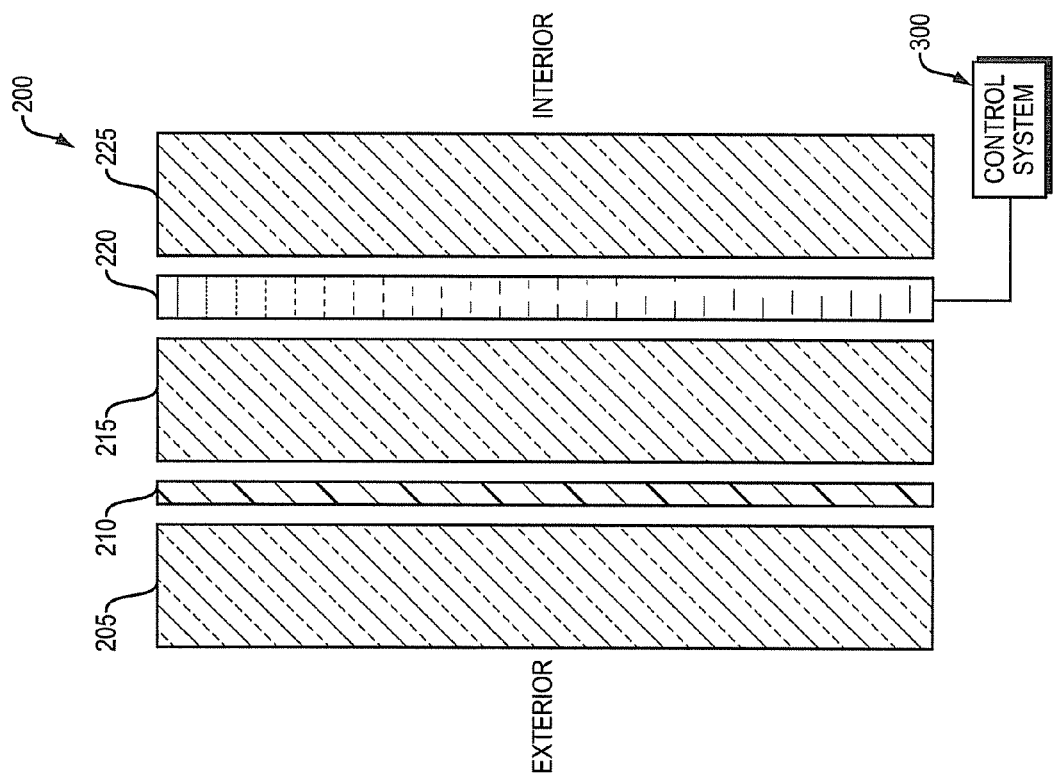
FIG. 2 is an alternative exemplary layering architecture of the variable focus windshield utilized in accordance with the exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

It should be noted that although the illustrative embodiment of the present invention is discussed below in reference to a variable focus windshield, the illustrative embodiment of the present invention may be utilized with any transmissive object, e.g., a side window, rear window, instrument cluster, display screen, etc., that includes a liquid crystal layer. Therefore, the exemplary embodiments of the present invention should not be limited as such.

The term "control device" is referred to herein as device utilizing a processor. However, it may also be understood be a controller, computer or any other device that is capable of controlling one or more devices and analyzing and processing data may also be utilized without departing from the overall exemplary embodiment of the present invention. Along those lines, although the below exemplary embodiment is described as using a single processor/control device to execute the above processes, it is understood that the above processes may also be performed by a by a plurality of processors on a plurality of controllers/devices throughout the vehicle without departing from the metes and bounds of the exemplary embodiment of the present invention.

Furthermore, the control logic of the exemplary embodiment of the present invention may be embodied as non-transitory computer readable media on a computer readable medium containing executable program instructions executed by the processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The illustrative embodiments of the present invention will now be described with reference to FIGS. 1-6. It should be understood, however, that these figures or merely for exemplary purposes and accordingly, the illustrative embodiment of the present invention may be implemented via other means that do not depart from the overall process of the present invention.

The exemplary embodiment of the present invention includes a system and method for controlling and adjusting the refractive index of a variable focus windshield by repositioning one or more liquid crystals embedded in the variable focus windshield based upon a driver's ocular prescription are provided herein. In particular, a vehicle in the illustrative embodiment of the present invention may be implemented with a variable focus windshield that includes adjustable liquid crystals (transmissive in nature) embedded therein to be arranged so that at least one portion the windshield is refracted based upon the driver's ocular prescription. The variable focus windshield may be in communication with a control system (hereinafter "the system") that is configured to control the operations of the variable focus windshield based on various factors input to the system and input and analyze data via a processor, memory, imaging devices, etc. These operations include but are not limited to activation, adjustments, current application, etc.

Figure 1:
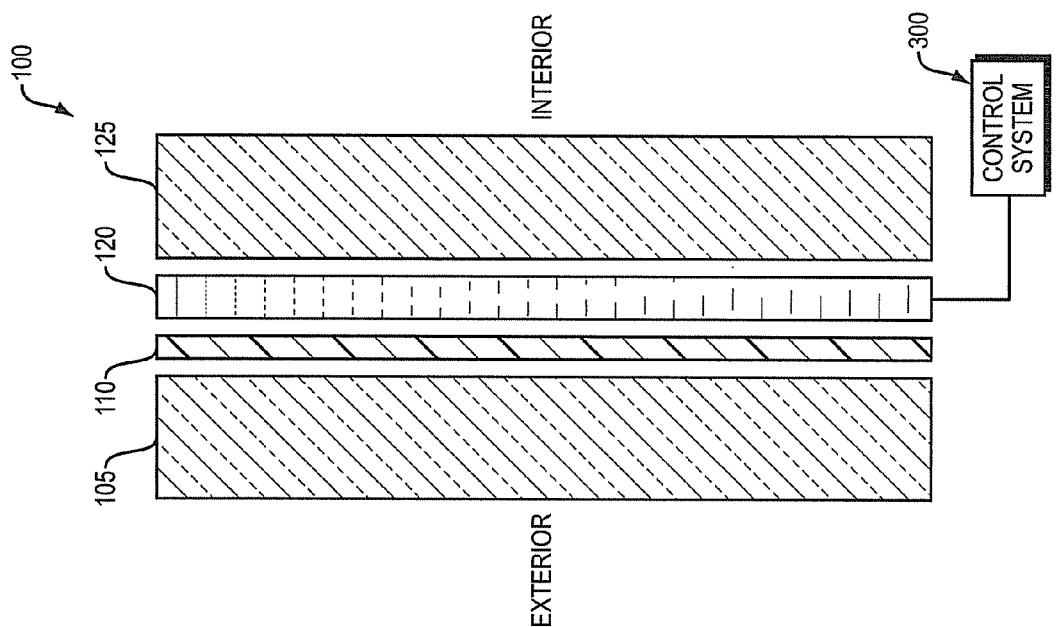
FIG. 1 is an exemplary layering architecture of a variable focus windshield utilized in accordance with the exemplary embodiment of the present invention.

FIGS. 1-2 are exemplary layering architectures of the variable focus windshield utilized in accordance with the exemplary embodiment of the present invention. Typically, a windshield of a vehicle is made up of a multilayer unit consisting of a plastic layer 110 which is surrounded by two sheets of glass 105, 125. In many countries, including the U.S., vehicular windshields are required by law to include this plastic layer referred to as laminated glass. Laminated glass can bend slightly under impact and is less likely to shatter than normal safety glass. This quality reduces the risk of injury to the automobile's passengers if the windshield were to break. Accordingly, the illustrative embodiment has been incorporated into this type of windshield in order to insure the safety of passengers.

As can be seen from FIG. 1, in the variable focus windshield 100, much like the typical windshield above, is made up of many layers. These layers include at least two glass layers 105, 125 and a plastic layer 110, e.g., a polyvinyl butyral (PVB). However, in present invention, a liquid crystal layer 120 is also disposed between the two glass layers 105, 125. As can be seen from FIG. 1, the liquid crystal layer (e.g., in a transmissive liquid crystal grid layer) may more specifically be disposed between the plastic layer 110 and the interior glass layer 125. Any well known transmissive liquid crystal architecture may be utilized provided the positioning of the liquid crystals may be altered via applying, for example, various electric currents in order to refract light passing therethrough or reposition the liquid crystals.

Alternatively, as can be seen from FIG. 2, a variable focus windshield 200 in the illustrative embodiment of the present invention may instead contain three layers of glass, 205, 215 and 225. In this exemplary embodiment, a liquid crystal layer may be disposed between the interior glass layer 225 and an intermediate glass layer 215. A plastic layer 210, e.g., a PVB layer, is then disposed between an exterior glass layer 205 and the intermediate glass layer 215. The alternative embodiment in FIG. 2 is more expensive to manufacture but has improved sound deadening characteristic that may be beneficial to some consumers.

Regardless of which configuration is utilized with the exemplary embodiment of the present invention, the liquid crystal layer 120 or 220 is electrically connected to a control system 300 which is utilized by the exemplary embodiment of the present invention to control the position of a plurality of liquid crystals that are embedded within the liquid crystal layer 120 or 220 by, for example, applying a specific electric current to the liquid crystal layer 120 or 220. Based up on the current supplied to the liquid crystals, the crystals are repositioned in a manner which affects the refractive index of the windshield.

Figure 3:
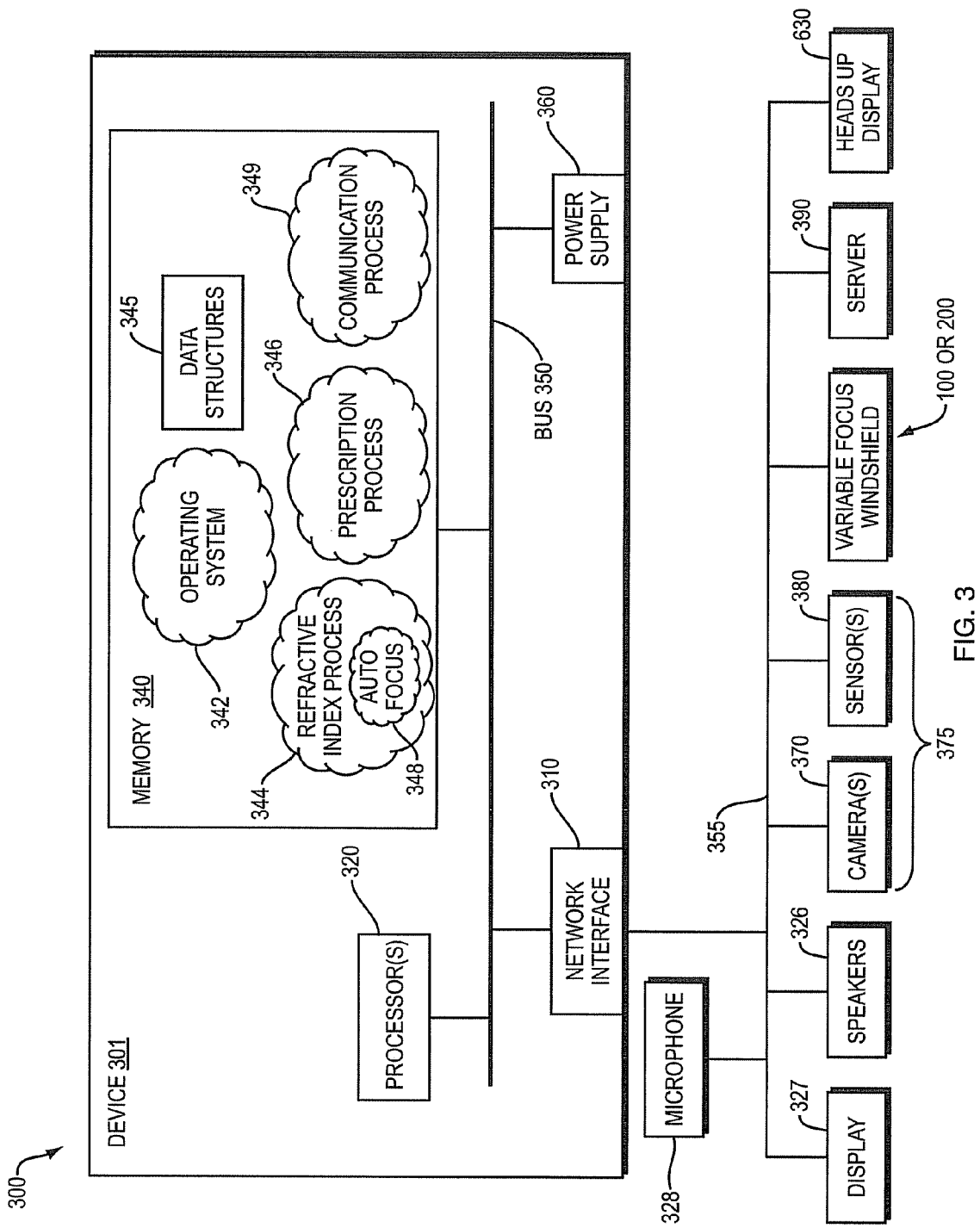
FIG. 3 is a is a schematic block diagram illustrating an exemplary system for executing processes of variable focus windshield of the exemplary embodiment of the present invention.

FIG. 3 depicts an exemplary control system which may be utilized in conjunction with the exemplary embodiment of the present invention. More specifically, a device or control device 301, such as a computer or control unit may be provided to control and execute various program instructions in order to control the refractive index of the variable focus windshield 100 or 200. In particular, the device 301 in FIG. 3 includes one or more network interfaces 310 (e.g., wired, wireless, PLC, or the like) that are able to connect to any one of a number of networks, such as Controller Area Network (CAN), telematics network, etc. The device 301 also includes at least one processor 30, and a memory or storage device 340 interconnected by a system bus 350, as well as a power supply 360 (e.g., battery, plug-in, etc.). The device 301 may also be connected to speakers 326, microphone 328 and display device 327 for communicating with the driver.

The network interface(s) 310 contain the mechanical, electrical, and signaling circuitry for communicating data over links coupled to a network. Whether those links are wired or wireless is irrelevant to the illustrative embodiment of the present invention as either may be used. The network interfaces may be configured to transmit and/or receive data using a variety of different communication protocols. Note, further, that the device may have two different types of network connections 310, e.g., wireless and wired/physical connections, and that the view herein is merely for illustration. Also, while the network interface 310 is shown separately from power supply 360, the network interface 310 may communicate through the power supply 360, or may be an integral component of the power supply. In some specific configurations the signal may be coupled to the power line feeding into the power supply 360.

The memory or storage device 340 includes a plurality of storage locations that are addressable by the processor(s) 320 and the network interfaces 310 for storing software programs and data structures associated with the embodiments described herein. Note that certain devices may have limited memory or no memory (e.g., no memory for storage other than for programs/processes operating on the device and associated caches). Alternatively, the data utilized by the processes in these types of memory systems may be stored on a remote server 390 and downloaded to and uploaded from the device 301 accordingly through the network interface 310.

The processor 320 may include necessary elements or logic configured to execute the software programs and manipulate the data structures 345. An operating system 342, portions of which are typically resident in memory 340 and executed by the processor, functionally organizes the device 301 by, inter alia, invoking operations in support of software processes and/or services executing on the device. These software processes and/or services may also include the illustrative refractive index process 344, prescription identification process 346, an auto focus process 348, and a communication processes 349. Note that while the communication process 349 is shown in centralized memory or storage device 340, alternative embodiments provide for the process to be specifically operated within the network interfaces 310 as well. The communication process 349 may be any known method of communication between two or more devices, e.g., Bluetooth, Wi-Fi, etc. Accordingly, the illustrative embodiment is not limited to any specific type of communication process and instead is intended to include all communication processes which are capable of transferring data within a vehicle.

Furthermore, the network interface(s) 310 may be configured to communicate with a plurality of sensory objects 375. These sensory objects 375 may be any one of a plurality of imaging devices (e.g., cameras 370) or sensors (e.g., ultrasonic sensors 380) that are installed on, in or around the vehicle. It should be noted that although the exemplary embodiment is just illustrated as including sensors and cameras in FIG. 1, the sensory objects 375 may also include internal measurement devices, such as a speedometers, an engine control unit(s) (ECU), seat position sensors, and video cameras as well as still imaging devices, etc. Therefore, the sensory objects 375 may include any module, device, or system which is capable of providing data to the refractive image process 344, auto focus process 348 and prescription process 346 that can be used to control the variable focus windshield of the exemplary embodiment of the present invention. Accordingly, the sensory objects 375 are not limited to those described above.

Figure 4A:
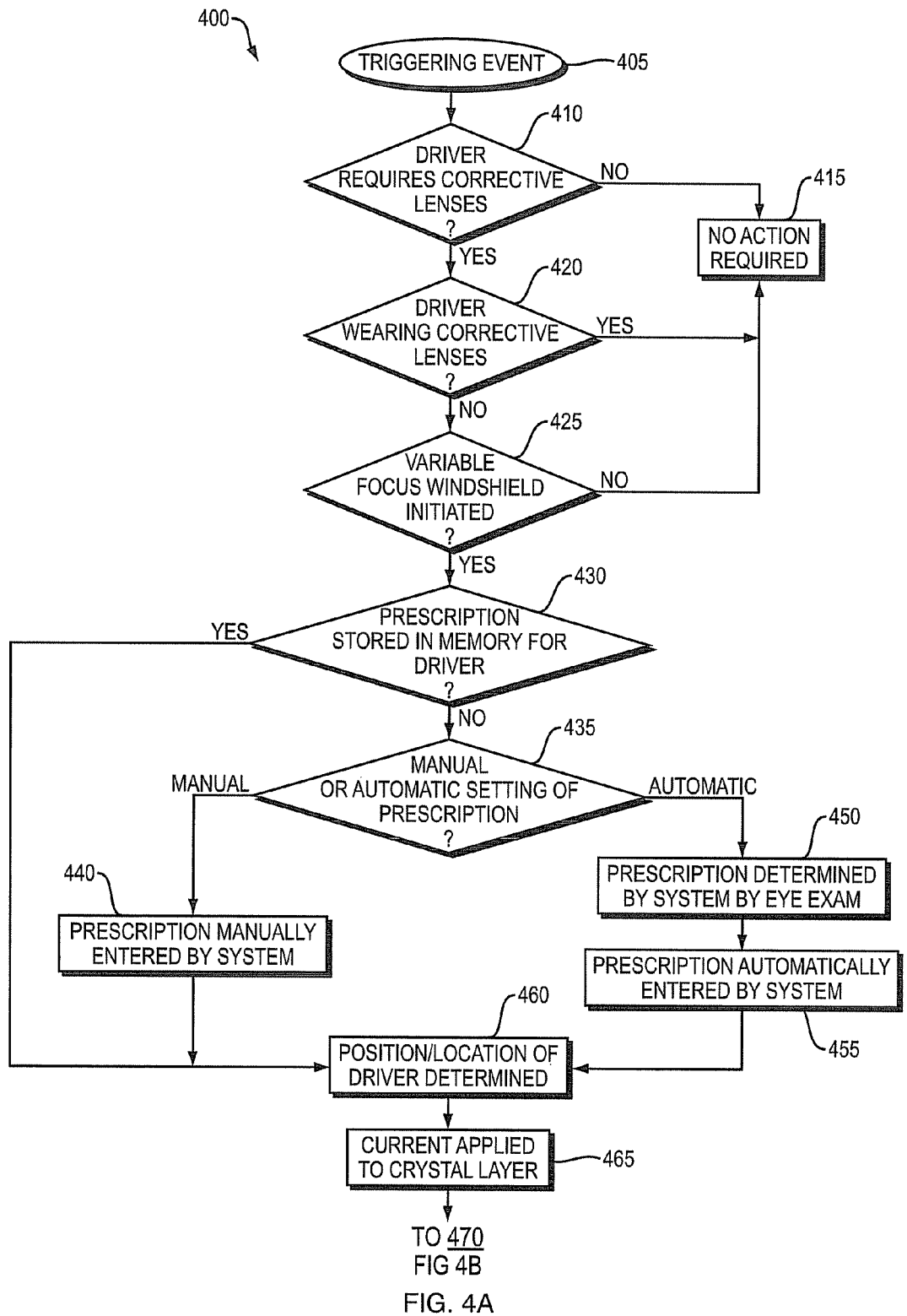
FIGS. 4A-B is a flow chart illustrating an exemplary algorithm which is executed by the system of FIG. 3 in accordance with the exemplary embodiment of the present invention.
Figure 4B:
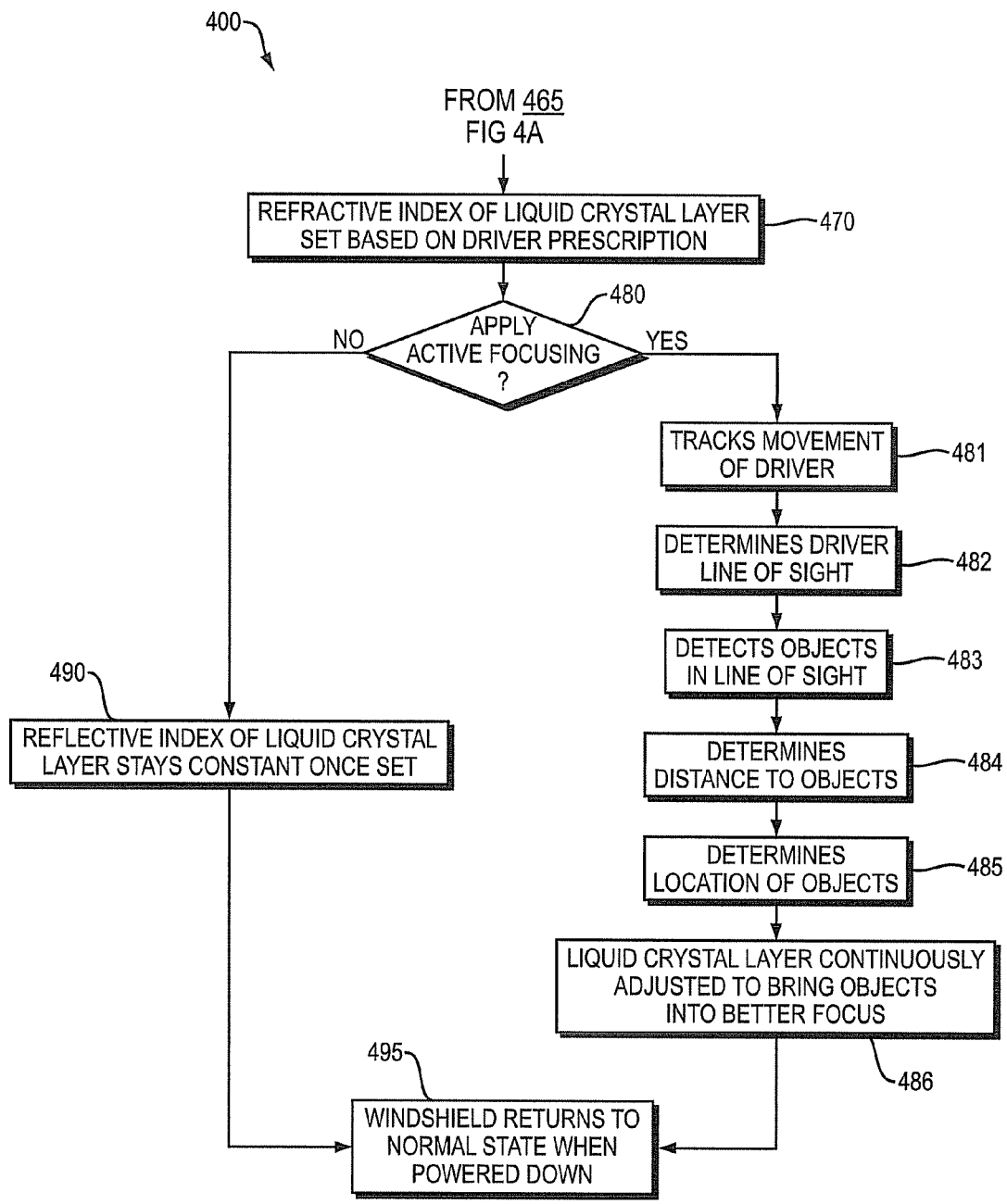

As mentioned above, the refractive index process 344 may be configured to execute a plurality of processes via the processor 320. FIGS. 4A-B is a is a flow chart illustrating an exemplary algorithm which may be executed by the control system 300 of FIG. 1 in accordance with the exemplary embodiment of the present invention. It should be noted that the flow chart illustrated in FIGS. 4A-B is a simplified flow chart of the system and methods, and thus the actual chart could be much more complicated with many other options depending on the actual situations input by the developer which are not necessary to the overall operation of the system, but to their unique configuration. Furthermore, as stated above, the control logic for executing the algorithmic process below may be embodied on a non-transitory computer readable medium or stored on a memory or hard drive of the device 301 or remote server 390.

Accordingly, the device 301 executes a startup, determination and adjustment process as will be described below. However, as mentioned above, the algorithmic abilities of the illustrative embodiment of the present invention are not limited to the process discussed below and should be construed to be able to include additional options and features which may be integrated therein and known to be easily integrated by those skilled in the art.

FIGS. 4A-B, as stated above, include a flow chart illustrating an exemplary algorithm which is executed by the system of FIG. 3 in accordance with the exemplary embodiment of the present invention. More specifically, the method for controlling the refraction of the windshield 400 is as follows. Initially, the control system in a vehicle may be activated by a triggering event, such as ignition of the vehicle, an eye test conducted on the driver, or images of the driver received at the control unit in response to the driver entering the vehicle in step 405. The control device then may determine whether the driver requires corrective lenses in order to drive by identifying the driver in step 410. The driver may be identified by a specific key fob that is associated with the driver, by logging into the control system 300 with a specific username or by a default setting when there is only one driver for the vehicle. These, identifying factors are merely meant as exemplary and should not be construed as limiting in nature additionally, these identification factors may take place prior to or after the triggering event depending upon what the triggering event is.

If the driver does not require corrective lenses to drive, the variable focus windshield is not activated (step 415) and no action is taken by the control system 300 (hereinafter "the system"). When, however, it is determined that the driver requires corrective lenses in step 410, the system may then determine whether or not the driver is in fact wearing their corrective lenses (i.e., either their glasses or contact lenses) before activating the variable focus windshield. If it is determined that the driver is wearing their corrective lenses, no action is taken and the variable focus windshield is not activated (step 415). When, however, the driver is not wearing their corrective lenses, the process continues to step 425 in which the variable focus windshield is activated accordingly.

It should be noted as well that it is common for a number of drivers to wear contact lenses rather than glasses as a form of corrective lens while driving. Therefore, prior to activating the variable focus windshield, in those cases were an eye exam is not performed on the driver, the system may also be configured to determine if the driver is a contact lens wearer based for example an input question to the driver (e.g., Is the driver currently wearing contact lenses?). Accordingly, the system, in this instance, would only activate the system, when it is determined that the driver is not wearing his or her corrective contact lenses. This, however, is merely an example and any other method for determining whether or not a driver is wearing contact lenses (or any type of corrective lens for that matter) may also be utilized.

It should be noted, that in some instances the driver may not wish to activate the variable focus windshield. Therefore, some embodiments of the present invention may require authorization by the driver in order to activate the variable focus windshield even if it is determined that the driver is not wearing his or her corrective lenses. In this case, if the driver confirms that the variable focus windshield should be activated, the process moves to step 430. If, however, the driver does not wish to activate the variable focus windshield, the driver may dismiss an activation prompt and the system takes no further action (step 415).

Once the variable focus windshield has been activated in step 425, the system 300 then determines a driver's ocular prescription strength. In particular, the system first determines in step 430 whether the driver's ocular prescription has already been stored either in the memory 340 of the control device 301 or in any other storage device connected to the control device through the network interface 310, e.g., the remote server 390. This data may be stored in the data structure 345, e.g., as a data table, in which a profile for each previous driver has been created and stored. If the ocular prescription has already been stored in the system 300 or on a remote server 390, then the process skips to step 460.

When, however, the driver's ocular prescription strength has not be previously stored in the system, the algorithm 300 proceeds to step 435 in which the ocular prescription strength of the driver is either entered manually by the driver in step 440 or determined automatically by the system 300 in step 450. When prescription strength is manually entered by the driver, the driver may do so via the display 327 (e.g., a touch screen display) or voice control via the microphone 328 and speakers 326. The touch screen and voice control systems may be made up of any well known touch screen and voice control system that may be integrated with the exemplary embodiments of the present invention.

The system 300 may automatically determine the driver's ocular prescription by, for example, conducting an eye exam on a heads up display 620 (see FIG. 6) based upon the distance a driver is sitting from the windshield. To conduct the eye exam, a conventional eye chart may be displayed in front of the driver at a predetermined distance from the driver's face. The system may then request that the driver read off, through a conventional voice communication system, the lowest line of the eye chart that is discernable by the driver. Based upon the driver's response, the corresponding prescription strength required to correct the driver's vision may be entered in to the data structure 345 by the system. Correlating prescriptions may be stored in a data structure either on the internal memory 340 or on the remote server 390.

Next in step 460, a plurality of seat sensors or an ultrasonic sensor positioned in front of the driver may be utilized to determine the position of the driver in relation to the variable focus windshield and power is applied to crystal layer. Based upon the determined ocular prescription of the driver and the required refractive index for a driver positioned a determined distance away from the variable focus windshield, the system dynamically adjusts a refractive index of at least a portion of the variable focus windshield by repositioning the liquid crystals therein to change the refractive index of that portion of the windshield to correlate with the driver's ocular prescription strength in step 470. This may be done by, for example, applying a specific amount of current to the liquid crystals embedded within the windshield, or by any other method known in the art for rearranging liquid crystals so that their refractive index is altered accordingly.

Figure 5:
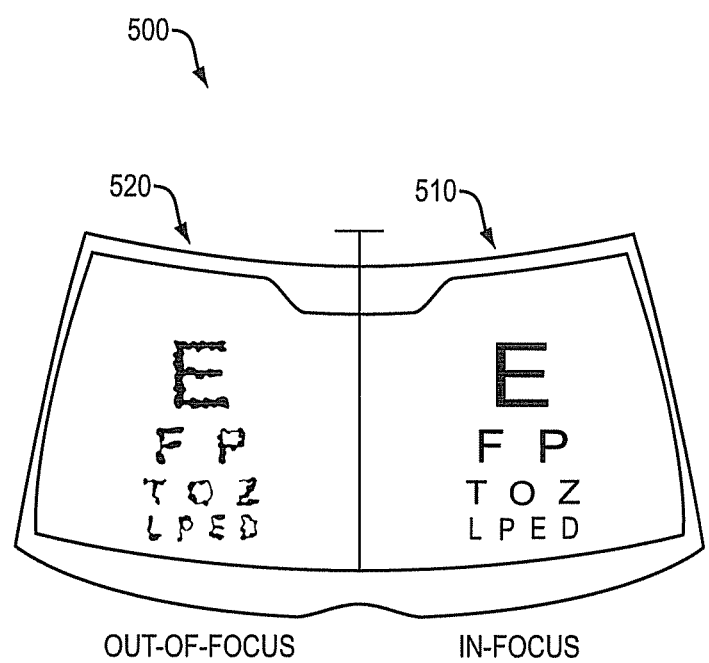
FIG. 5 is a perspective view from the drivers perspective of the exemplary variable focus windshield of exemplary embodiment of the present invention.
Figure 6:
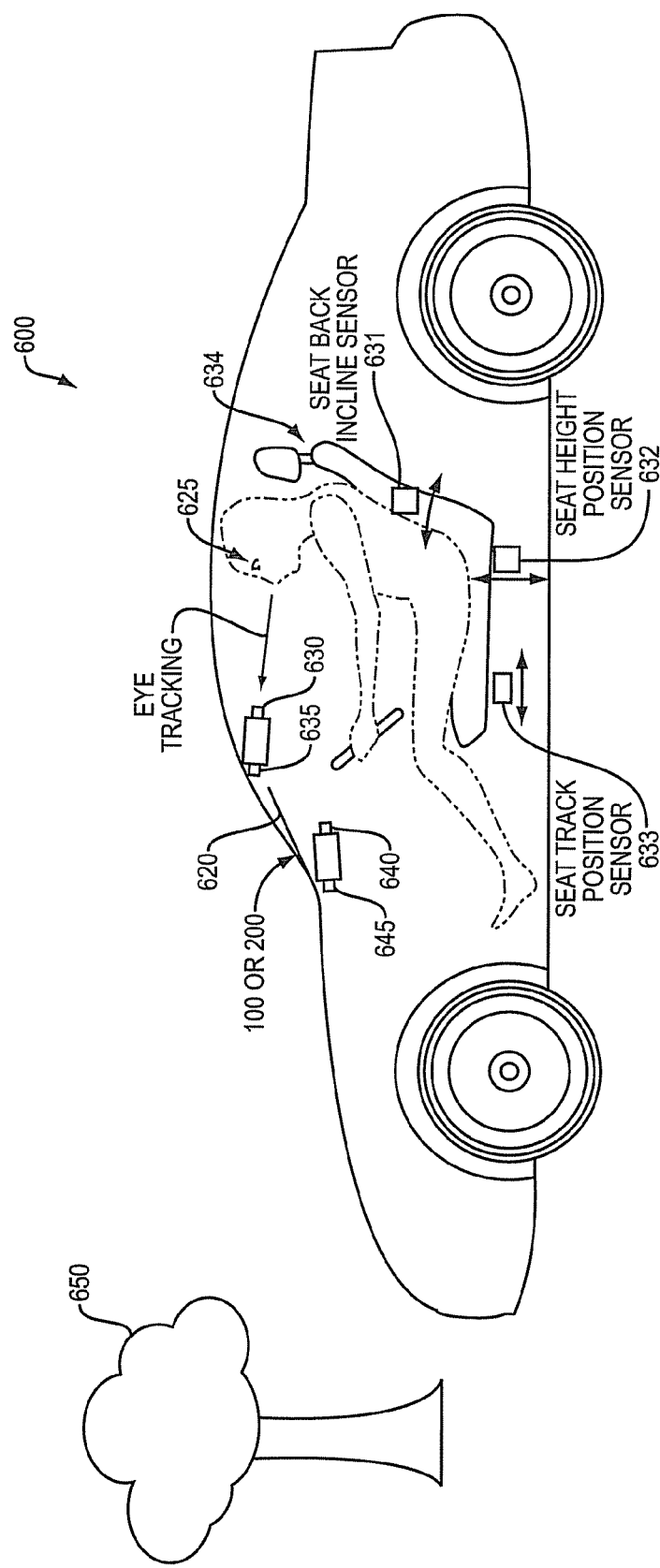
FIG. 6 is an exemplary active focus system in accordance with the exemplary embodiment of the present invention.

By changing the refractive index, the visibility of a driver can be rectified as shown in FIG. 5. As can be seen from FIG. 5, when the variable focus windshield is not activated and the liquid crystals are not adjusted appropriately. The vision of the driver may appear as shown in 520, hazy and unclear. However, once activated, the driver's vision may be corrected as shown in 520.

The system described above may also include an active focus system. In this case, once the refractive index of the variable focus windshield has been adjusted to the correct ocular prescription strength. The process then moves to step 480. When the system includes an active focus system 348 and the active focus system is turned on, the system is configured to constantly adjust the focus of the variable focus windshield based upon results calculated by the active focus system 348. In particular, referring to FIG. 6 and vehicle control system 600, once the active focus system 348 is activated, an interior camera 630 installed in the vehicle may be configured to track a driver's eye movement 625 to determine a current line of sight of the driver in step 481. Then, based upon the driver's tracked eye movement in step 481, determine the driver's current line of sight in step 482. Based upon the driver's current line of sight, one or more objects 650 (FIG. 6) outside of the vehicle within the current line of sight of the driver may be detected by one or more exterior cameras 635,645 (FIG. 6) or ultrasonic sensors 380 in steps 484 and 485. The distance to and location of the one or more objects 650 from and in relation to a seat position of the driver is then determined by data collected from, for example, by a seat track position sensor 633, a seat height position sensor 632, and/or a seat back incline sensor 634.

Based upon the driver's detected line of sight, the system may also be configure to continuously focus in on objects 650 to bring them into better focus for the driver. Furthermore, if current is only applied to a portion of the windshield, the portion of the windshield that current is applied to may also be continuously readjusted by the system based upon the data collected by the active focus system 348 so that the portion of the windshield in which the refractive index is applied may also change continuously based upon the line of sight of the driver.

Again referring to FIG. 4B, once the refractive index has been set, regardless of whether or not the active focus system has been applied (i.e., in steps 481-486) or is consistent (in step 490). The variable focus windshield returns to its normal state once the system is powered down, either upon request of the driver or upon powering down of the vehicle.

Advantageously, the exemplary embodiment of the present invention allows for a driver to have a means of correcting his or her vision while driving even when the driver prescription is incorrect or is not wearing his or her corrective lenses in the vehicle. Furthermore, the illustrative embodiments of the present invention allow for dynamic correction of the refractive index based upon the driver's movements within the vehicle.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks, CDs, RAM, EEPROM, etc.) having program instructions executing on a computer, hardware, firmware, or a combination thereof. Furthermore, although the above illustrative embodiment is described as being applied to a windshield it may also be applied to door windows and read windshields as well and thus should not be limited thereto. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
activating, by a control device in a control system, a liquid crystal layer installed in a transmissive object of a vehicle in response to a triggering event;
determining, by the control device, an ocular prescription strength of a driver; and
adjusting a refractive index of one or more liquid crystal layers within the liquid crystal layer to adjust a refractive index of a windshield to correlate with the determined ocular prescription,
wherein the liquid crystal layer is activated in response to the control device detecting that the driver is not wearing corrective lenses and the liquid crystal layer is installed in a variable focus windshield of the vehicle.

2. The method of claim 1, wherein the control device determines that the driver is not wearing corrective lenses by utilizing and analyzing images from a camera installed in within the vehicle.

3. The method of claim 2, wherein the system determines that the driver is not wearing corrective lenses in response to a driver response to a system inquiry.

4. The method of claim 1, wherein the liquid crystal layer is not activated when the driver is wearing corrective lenses.

5. The method claim 1, wherein the ocular prescription strength of the driver is manually entered by the driver via a touch screen display or voice control.

6. The method of claim 1, further comprising:
in response to determining the ocular prescription strength of a driver, detecting the position of a driver's seat in relation to a variable focus windshield in which the liquid crystal layer is installed; and
adjusting the refractive index of the liquid crystal layer to correlate with the driver's prescription.

7. The method of claim 6, further comprising:
determining whether to initiate an active focus system,
in response to determining that the active focus system should be initiated, constantly adjusting the focus of the variable focus windshield based upon results calculated by the active focus system, and
in response to determining that the active focus systems should not be initiated, maintaining a constant refractive index until the vehicle is powered down.

8. The method of claim 7, further comprising:
in response to initiating the active focus system, tracking, via an interior camera installed in the vehicle, eye movement of the driver to determine a current line of sight of the driver;
detecting one or more objects outside of the vehicle within the current line of sight of the driver via one or more exterior cameras; and
measuring, by the control device, a distance to the one or more objects from the seat position of the driver and a location of the one or more objects in relation to the seat position of the driver.

9. The method of claim 1, wherein the ocular prescription strength of the driver is automatically detected by the control device.

10. The method of claim 9, further comprising:
administering, by the control device, an eye test on a heads up display;
based upon the results of the eye test, determining by control device the ocular prescription strength of the driver; and automatically entering the ocular prescription strength of the driver into a data table associated with a particular driver and storing the ocular prescription strength for later use.

11. The method of claim 1, wherein the liquid crystal layer is installed in a variable focus windshield and only a particular portion of the variable focus windshield is activated at any given moment in time.

12. The method of claim 1, wherein applying a specific current to the liquid crystal layer repositions a plurality of liquid crystals within the liquid crystal layer to in turn adjust the refractive index of a transmissive object which the liquid crystal layer is installed therein.

13. A system installed within a vehicle, the system comprising:
    a liquid crystal layer installed in a transmissive object including at least one protective layer, at least two glass layers and at least one liquid crystal layer;
    a control system including a control device, the control device configured to activate the liquid crystal layer in response to a triggering event, determine an ocular prescription strength of a driver, and adjust a refractive index of the at least one liquid crystal layer to adjust a refractive index of a windshield to correlate with the determined ocular prescription strength,
    wherein the liquid crystal layer is activated in response to the control device detecting that the driver is not wearing corrective lenses and the liquid crystal layer is installed in a variable focus windshield of the vehicle.

14. The system of claim 13, wherein the control device is configured to apply a specific current to a liquid crystal grid layer to reposition a plurality of crystals within the LCD grid layer and in turn adjust the refractive index of the liquid crystal layer.

15. The method of claim 13, wherein the liquid crystal layer is installed in a variable focus windshield and the variable focus windshield includes a polyvinyl butyral (PVB) layer and a liquid layer adjacent to one another and disposed between two layers of glass.

16. The method of claim 13, wherein the liquid crystal layer is installed in a variable focus windshield and the variable focus windshield includes a polyvinyl butyral layer disposed between a first layer of glass and a second layer of glass, and an LCD grid layer is disposed between the second layer of glass and a third layer of glass.

17. A non-transitory computer readable medium containing program instructions executed by a processor, the non-transitory computer readable medium comprising:
    program instructions that activate a liquid crystal layer in a transmissive object installed in a vehicle in response to a triggering event being detected;
    program instructions that determine an ocular prescription strength of a driver; and
    program instructions that adjust a refractive index of one or more liquid crystal layers within the liquid crystal layer to adjust a refractive index of a windshield to correlate with the determined ocular prescription strength,
    wherein the liquid crystal layer is activated in response to detecting that the driver is not wearing corrective lenses.

18. The non-transitory computer readable medium of claim 17, further comprising program instructions that determine that the driver is not wearing corrective lenses by analyzing at least one image collected by a camera installed in within the vehicle.

* * * * *